US012598404B2

(12) United States Patent
Xhakoni et al.

(10) Patent No.: US 12,598,404 B2
(45) Date of Patent: Apr. 7, 2026

(54) PIXEL ARRANGEMENT AND METHOD FOR OPERATING A PIXEL ARRANGEMENT

(71) Applicants: ams Sensors Belgium BVBA, Berchem (BE); ams Sensors USA Inc., Plano, TX (US)

(72) Inventors: Adi Xhakoni, Kessel Lo (BE); Scott Johnson, Boise, ID (US); Denver Lloyd, Boise, ID (US)

(73) Assignees: ams Sensors USA Inc., Plano, TX (US); ams Sensors Belgium BVBA, Berchem (BE)

( * ) Notice: Subject to any disclaimer, the term of this patent is extended or adjusted under 35 U.S.C. 154(b) by 128 days.

(21) Appl. No.: 18/681,753

(22) PCT Filed: Aug. 10, 2022

(86) PCT No.: PCT/US2022/040002
§ 371 (c)(1),
(2) Date: Feb. 6, 2024

(87) PCT Pub. No.: WO2023/018836
PCT Pub. Date: Feb. 16, 2023

(65) Prior Publication Data
US 2024/0357254 A1      Oct. 24, 2024

Related U.S. Application Data

(60) Provisional application No. 63/263,861, filed on Nov. 10, 2021.

(30) Foreign Application Priority Data

Aug. 10, 2021    (DE) .......................... 102021120779.7
Mar. 31, 2022    (DE) .......................... 102022107660.1

(51) Int. Cl.
H04N 25/77      (2023.01)
H04N 25/51      (2023.01)
(Continued)

(52) U.S. Cl.
CPC .................................... *H04N 25/77* (2023.01)

(58) Field of Classification Search
CPC ...... H04N 25/77; H04N 25/51; H04N 25/583; H04N 25/589; H04N 25/59; H04N 25/771
See application file for complete search history.

(56) References Cited

U.S. PATENT DOCUMENTS 7,129,500 B2    10/2006  Tashiro et al.
7,538,810 B2    5/2009   Koizumi et al.
(Continued)

FOREIGN PATENT DOCUMENTS

DE      102020004050 A1     1/2021
EP          1732315 A1     12/2006
(Continued)

OTHER PUBLICATIONS

Chen Xu et al., "A Stacked Global-Shutter CMOS Imager with SC-Type Hybrid-GS Pixel and Self-Knee Point Calibration Single Frame HDR and On-Chip Binarization Algorithm for Smart Vision Applications", IEEE International Solid-State Circuits Conference—(ISSCC), San Francisco, USA, Feb. 18, 2019, total pp. 3.
(Continued)

*Primary Examiner* — Marly S Camargo
(74) *Attorney, Agent, or Firm* — Slater Matsil, LLP

(57) ABSTRACT

In an embodiment a pixel arrangement includes a photodiode, a circuit node, a transfer transistor coupled to the photodiode and to the circuit node, an amplifier with an input coupled to the circuit node, a first capacitor and a second capacitor, a first transistor coupled to an output of the
(Continued)

amplifier and to the first capacitor, a second transistor coupled to the first transistor and to the second capacitor, a supply terminal, a reset transistor coupled to the supply terminal, a coupling transistor coupled to the circuit node and to the reset transistor and a third capacitor with a first electrode coupled to a node between the reset transistor and the coupling transistor.

15 Claims, 5 Drawing Sheets

(51) Int. Cl.
    *H04N 25/59*         (2023.01)
    *H04N 25/771*       (2023.01)

(56)                References Cited

U.S. PATENT DOCUMENTS

| | | | |
|---|---|---|---|
| 8,541,731 | B2 | 9/2013 | Sugawa et al. |
| 8,575,533 | B2 | 11/2013 | Yen et al. |
| 9,402,039 | B2 | 7/2016 | Solhusvik et al. |
| 9,881,953 | B2 | 1/2018 | Park |
| 9,948,875 | B2 | 4/2018 | Cremers et al. |
| 10,250,832 | B1 | 4/2019 | Xu et al. |
| 11,050,966 | B2 | 6/2021 | Mori et al. |
| 11,153,524 | B1 | 10/2021 | Yen et al. |
| 11,218,653 | B2 | 1/2022 | Yang et al. |
| 11,516,418 | B2 | 11/2022 | Aoki |
| 11,665,451 | B2 | 5/2023 | Seo et al. |
| 11,696,048 | B1 * | 7/2023 | Rahman ................. H04N 25/77 |
| 12,096,140 | B2 | 9/2024 | Lloyd et al. |
| 2002/0190215 | A1 | 12/2002 | Tashiro et al. |
| 2004/0169753 | A1 | 9/2004 | Gulbransen et al. |
| 2006/0158542 | A1 | 7/2006 | Mizuno et al. |
| 2009/0127438 | A1 | 5/2009 | Barbier et al. |
| 2009/0256060 | A1 | 10/2009 | Meynants et al. |
| 2011/0157441 | A1 | 6/2011 | Okita et al. |
| 2011/0221944 | A1 | 9/2011 | Deschamps |
| 2011/0242381 | A1 | 10/2011 | Sakakibara et al. |
| 2014/0239161 | A1 | 8/2014 | Meynants et al. |
| 2017/0324916 | A1 | 11/2017 | Sugawa et al. |
| 2019/0014276 | A1 | 1/2019 | Cheung et al. |
| 2019/0094394 | A1 | 3/2019 | Matsumoto |
| 2019/0273879 | A1 | 9/2019 | Xu et al. |
| 2020/0112697 | A1 | 4/2020 | Huang |
| 2020/0174122 | A1 | 6/2020 | Kimura |
| 2020/0244900 | A1 | 7/2020 | Hynecek |
| 2021/0051283 | A1 | 2/2021 | Cowley et al. |
| 2021/0160448 | A1 | 5/2021 | Seo et al. |
| 2021/0289154 | A1 | 9/2021 | Johnson et al. |
| 2022/0086375 | A1 | 3/2022 | Yang et al. |
| 2022/0191418 | A1 | 6/2022 | Jung et al. |
| 2022/0321759 | A1 | 10/2022 | Miyauchi et al. |
| 2023/0051657 | A1 * | 2/2023 | Loyd .................... H04N 25/589 |

FOREIGN PATENT DOCUMENTS

| | | | |
|---|---|---|---|
| EP | 2063632 | A1 | 5/2009 |
| EP | 1681850 | B1 | 3/2010 |
| EP | 1259066 | B1 | 9/2012 |
| EP | 2587794 | A2 | 5/2013 |
| EP | 2288142 | B1 | 1/2014 |
| JP | 6043002 | B1 | 12/2016 |
| JP | 2019062388 | A | 4/2019 |
| JP | 2020068267 | A | 4/2020 |
| JP | 2024529154 | A | 8/2024 |
| KR | 20120116805 | A | 10/2012 |
| KR | 20210066048 | A | 6/2021 |
| WO | 2004074789 | A1 | 9/2004 |
| WO | 2018190363 | A1 | 10/2018 |

OTHER PUBLICATIONS

Guy Meynants et al., "Backside illuminated global shutter CMOS image sensors", R51, IEEE Int. Image Sensor Workshop, 2011, total pp. 4.

Ken Miyauchi et al., "4.0μm Stacked Voltage Mode Global Pixels with A BSI LOFIC and A PDAF Capability", R49, International Image Sensor Workshop (IISW), Sep. 2021, total pp. 4.

Omnivision, "High Dynamic Range Backside Illuminated Voltage Mode Global Shutter CIS for in Cabin Monitoring", Sep. 2021, total pp. 26.

Minseok Oh et al., "3.0μm Backside illuminated, lateral overflow, high dynamic range, LED flicker mitigation image sensor", R34, Proc. Int. Image Sensor Workshop (pp. 262-265), Jun. 2019, total pp. 4.

Johannes Solhusvik et al., "A 1280x960 2.8μm HDR CIS with DCG and Split-Pixel Combined", R32, In Int. Image Sensor Workshop (pp. 254-257), 2019, total pp. 4.

Ken Miyauchi et al., "A high optical Performance 2.8μm BSI LOFIC Pixel with 120ke FWC and 160μV/e conversion Gain", R30, In Proceedings of the International Image Sensor Workshop, Snowbird, UT, USA (pp. 24-27), Jun. 23-27, 2019, total pp. 4.

K. Mori et al., "Back Side Illuminated High Dynamic Range 4.0μm Voltage Domain Global Shutter Pixel with Multiple Gain Readout", R50, Dec. 10, 2019, total pp. 4.

T. Asatsuma et al., "Sub-pixel Architecture of CMOS Image Sensor Achieving over 120 dB Dynamic Range with less Motion Artifact Characteristics", R31, In Proceedings of the 2019 International Image Sensor Workshop (vol. 1), 2019, total pp. 4.

* cited by examiner

PIXEL ARRANGEMENT AND METHOD FOR OPERATING A PIXEL ARRANGEMENT

CROSS-REFERENCE TO RELATED APPLICATIONS

This patent application is a national phase filing under section 371 of PCT/US2022/040002, filed Aug. 10, 2022, which claims the priority U.S. provisional application 63/263,861, filed Nov. 10, 2021, and German patent application 102021120779.7, filed Aug. 10, 2021, and German patent application 102022107660.1, filed Mar. 31, 2022, each of which is incorporated herein by reference in its entirety.

TECHNICAL FIELD

A pixel arrangement, an image sensor with a pixel arrangement and a method for operating a pixel arrangement are provided.

BACKGROUND

An image sensor typically includes an array of pixel arrangements. A high dynamic range for the conversion of electromagnetic radiation into an electrical signal is beneficial. However, a size of a pixel arrangement has to be kept small.

SUMMARY

Embodiments provide a pixel arrangement, an image sensor with a pixel arrangement and a method for operating a pixel arrangement which is able to reduce a gain of signal conversion.

In an embodiment, a pixel arrangement comprises a photodiode, a circuit node, a transfer transistor coupled to the photodiode and to the circuit node, an amplifier with an input coupled to the circuit node, a first and a second capacitor, a first transistor coupled to an output of the amplifier and to the first capacitor, a second transistor coupled to the first transistor and to the second capacitor, a supply terminal, a reset transistor coupled to the supply terminal, a coupling transistor coupled to the circuit node and to the reset transistor, and a third capacitor with a first electrode coupled to a node between the reset transistor and the coupling transistor.

In an embodiment of the pixel arrangement, the transfer transistor and the coupling transistor are set in a conducting state at a start of a first storage phase. The first and the second transistor or the first transistor are set in a conducting state before an end of the first storage phase.

Advantageously, the circuit node has a capacitive characteristic. The circuit node has a capacitance such as e.g. a diffusion capacitance or a floating diffusion capacitance. Thus, charge provided by the photodiode can applied to the capacitance of the circuit node and to the third capacitor via the transfer transistor and the coupling transistor in the first storage phase. Thus, the charge provided by the photodiode is detected with low sensitivity by storing this charge not only by the capacitance of the circuit node but also by the third capacitor. This reduces a capacitance voltage at the capacitance of the circuit node. This voltage is amplified and stored in the first and the second capacitor. The pixel arrangement can be realized in a small area.

In an embodiment of the pixel arrangement, the first and the second transistor are set in a non-conducting state at the start of the first storage phase. The transfer transistor and the coupling transistor are set in a non-conducting state at the end of the first storage phase.

In an embodiment of the pixel arrangement, the transfer transistor is set in a conducting state at a start of a second storage phase. The first transistor is set in a conducting state before an end of the second storage phase.

In an embodiment of the pixel arrangement, the first transistor is set in a non-conducting state at the start of the second storage phase. The transfer transistor is set in a non-conducting state at the end of the second storage phase. The second transistor and the coupling transistor are continually in a non-conducting state during the second storage phase.

Advantageously, charge at the capacitance of the circuit node is not provided to the third capacitor via the coupling transistor in the second storage phase. Thus, charge provided by the photodiode can be detected with high sensitivity by storing this charge only by the capacitance of the circuit node and not by the third capacitor. This keeps a voltage swing at the capacitance high. This voltage is amplified and stored in the first capacitor.

In an embodiment, the pixel arrangement further comprises a reference voltage terminal which is coupled to a second electrode of the third capacitor. The reference voltage terminal is connected or coupled e.g. to the supply terminal, a further supply terminal, a reference potential terminal, a further reference potential terminal, a ground terminal or a voltage source.

In an embodiment, the pixel arrangement further comprises a reference potential terminal and a bias transistor coupled to the output of the amplifier and to the reference potential terminal. The bias transistor is configured to discharge the first capacitor or both the second and the first capacitor.

In an embodiment of the pixel arrangement, the first capacitor comprises a first electrode coupled to a node between the first transistor and the second transistor and a second electrode coupled to a further reference potential terminal. The second capacitor comprises a first electrode coupled to the second transistor and a second electrode coupled to the further reference potential terminal. The first transistor is configured to couple the first capacitor to the output of the amplifier. The second transistor is configured to couple the first capacitor to the second capacitor.

In an embodiment of the pixel arrangement, a supply voltage is tapped at the supply terminal. A reference potential is tapped at the reference potential terminal. A further reference potential is tapped at the further reference potential terminal. The supply voltage is positive with respect to the reference potential and to the further reference potential terminal.

In an embodiment, the pixel arrangement further comprises a further photodiode and a further transfer transistor that is coupled to the further photodiode and to the circuit node. In an example, different exposure times can be used for the photodiode and for the further photodiode.

In an embodiment of the pixel arrangement, the amplifier includes an amplifier transistor having a control terminal coupled to the input of the amplifier, a first terminal coupled to the further supply terminal and a second terminal coupled to the output of the amplifier.

In an embodiment, the pixel arrangement further comprises a further amplifier having an input coupled to the second capacitor. The pixel arrangement further comprises a column line and a select transistor that is coupled to the column line and to the output of the further amplifier.

Advantageously, the second capacitor is coupled to the column line via the further amplifier and the select transistor. Advantageously, an output voltage at the second capacitor is amplified and the amplified voltage is applied to the column line, when the select transistor is set in a conducting state.

In an embodiment of the pixel arrangement, the further amplifier includes a further amplifier transistor having a control terminal coupled to the input of the further amplifier, a first terminal coupled to the further supply terminal and a second terminal coupled to the output of the further amplifier.

In an embodiment, the pixel arrangement further comprises an additional amplifier having an input coupled to the first capacitor and an additional select transistor coupled to the column line and to the output of the additional amplifier. Advantageously, the first capacitor and the second capacitor can be separately coupled to the column line.

In an embodiment, an image sensor comprises an array of pixel arrangements, e.g. an n times m array of pixel arrangements.

In an embodiment, the image sensor further comprises a row driver configured to provide a transfer signal to a control terminal of the transfer transistor, a coupling signal to a control terminal of the coupling transistor, a reset signal to a control terminal of the reset transistor, a first control signal to a control terminal of the first transistor and a second control signal to a control terminal of the second transistor.

In an embodiment of the image sensor, the row driver is configured to perform the exposure phase and the storage phase for each of the pixel arrangements parallel and simultaneously. Thus, the exposure phase is a global exposure phase; the storage phase is a global storage phase. The row driver is configured to perform a readout phase for each of the pixel arrangements of one row parallel and simultaneously. The row driver is configured to perform the readout phases of the different rows one after the other, also named row by row; thus, the rows are read out sequentially. Alternatively, the row driver is configured to perform the readout phases of every nth row parallel and simultaneously (in this case, the image sensor includes a number n of parallel column lines for each column of the image sensor). Thus, at one point of time, one row or more than one row (e.g. every nth row) may be readout. The readout of the pixel arrangements 10 of one row or every nth row of an image sensor is performed at one point of time. Typically, the readout of the pixel arrangements 10 of the other rows of the image sensor is performed at other points of time.

In an embodiment of the image sensor, the row driver is configured to set the transfer transistor in the conducting state by the transfer signal and to set the coupling transistor in the conducting state by the coupling signal at the start of the first storage phase. The row driver is configured to set the first transistor in the conducting state by the first control signal and to set the second transistor in the conducting state by the second control signal before the end of the first storage phase.

In an embodiment of the image sensor, the row driver is configured to set the transfer transistor in a conducting state by the transfer signal at the start of the second storage phase and to set the first transistor in the conducting state by the first control signal before the end of the second storage phase.

In an example, the second storage phase follows the first storage phase.

In an embodiment of the image sensor, a first pulse of the transfer signal in the first storage phase has a first voltage value, a second pulse of the transfer signal in the second storage phase has a second voltage value, and the first voltage value is different from the second voltage value.

In an embodiment, a method for operating a pixel arrangement, comprises:

converting electromagnetic radiation into charge by a photodiode, providing a first pulse of a transfer signal to a transfer transistor and a pulse of a coupling signal to a coupling transistor for transferring charge from the photodiode to a capacitance of a circuit node and to a third capacitor at a start of a first storage phase of a storage phase, providing a pulse of a first control signal to a first transistor and a pulse of a second control signal to a second transistor before the end of the first storage phase for charging a first and a second capacitor as a function of a capacitance voltage at the capacitance of the circuit node, wherein the second capacitor is coupled via the second transistor to the first capacitor and wherein the first capacitor is coupled via the first transistor to the circuit node, or providing a pulse of the first control signal to the first transistor before the end of the first storage phase for charging the first capacitor as a function of a capacitance voltage at the capacitance of the circuit node wherein the second capacitor is coupled via the second transistor to the circuit node and the first capacitor is coupled via the first transistor to the circuit node.

The pixel arrangement and the image sensor described above are particularly suitable for the method of operating a pixel arrangement. Features described in connection with the pixel arrangement and the image sensor can therefore be used for the method and vice versa.

In an embodiment, the method comprises providing a second pulse of the transfer signal to the transfer transistor for transferring further charge from the photodiode to the capacitance of the circuit node at a start of a second storage phase, and providing a pulse of the first control signal to the first transistor before the end of the second storage phase for charging the first capacitor as a function of the capacitance voltage at the capacitance of the circuit node, wherein the second capacitor is coupled via the second transistor to the first capacitor and wherein the first capacitor is coupled via the first transistor to the circuit node, or providing a pulse of the second control signal to the second transistor before the end of the second storage phase for charging the second capacitor as a function of a capacitance voltage at the capacitance of the circuit node, wherein the second capacitor is coupled via the second transistor to the circuit node and the first capacitor is coupled via the first transistor to the circuit node.

In an embodiment of the method, there is a capacitance at the circuit node. The capacitance is realized e.g. as diffusion capacitance or floating diffusion capacitance. The capacitance is implemented e.g. as a pn-junction. The circuit node may be named diffusion node or floating diffusion node. In an example, there is no discrete capacitor connected to the circuit node. The capacitance results e.g. only from at least one parasitic capacitance.

In an embodiment of the method, the first pulse of the transfer signal in the first storage phase has a first voltage value and the second pulse of the transfer signal in the second storage phase has a second voltage value. The first voltage value is different from the second voltage value. The transfer transistor has a controlled path. The controlled path has a lower conductance value at the first voltage value as the controlled path at the second voltage value. The controlled path is a barrier for a flow of charge between the photodiode and the capacitance of the circuit node. The first pulse results in a higher barrier than the second pulse. The transfer signal realizes a barrier modulation of the barrier resulting from the transfer transistor.

In an embodiment of the method, the second storage phase follows the first storage phase. A first readout phase follows the second storage phase. There may be a time gap between an end of the second storage phase and a start of the first readout phase. A point of time of a start of the first readout phase is flexible. A second readout phase follows the first readout phase. In the first readout phase, one of the first and the second capacitor is readout via a column line and in the second readout phase, the other of the first and the second capacitor is readout via the column line. For example, in the first readout phase a low sensitivity signal is read out, and in the second readout phase a high sensitivity signal is read out.

In an embodiment of the method, in a third readout phase, the capacitance of the circuit node is reset and a reset signal is read out via the column line.

In an embodiment of the method, amplitudes are determined based on the differences between high/low sensitivity signal and their reset level. So, a first amplitude depends on the high sensitivity signal and the low sensitivity signal. The first amplitude is determined e.g. by the high sensitivity signal minus the low sensitivity signal or vice versa. A second amplitude depends on the low sensitivity signal and the reset signal. The second amplitude is determined e.g. by the low sensitivity signal minus the reset signal or vice versa. It is not the absolute value of the high sensitivity signal and the low sensitivity signal which counts but the signals referred to their respective reset levels. An output signal depends on the first and the second amplitude. The output signal represents an illumination of the photodiode. The reset signal represents an absence of an illumination. The reset signal or the reset level is a "dark" level. For determination of the reset signal e.g. in a third readout phase of the readout phase, the supply voltage is applied to the capacitance of the circuit node via the reset transistor and the coupling transistor.

In an embodiment, the method further comprises in a reset phase, providing a pulse of a reset signal to a reset transistor and a pulse of the coupling signal to the coupling transistor for providing a supply voltage to the capacitance of the circuit node and to the third capacitor. In an example, the photodiode is not reset on a row by row basis, but in a global operation. So, no pulse of the transfer signal is performed during pixel readout operation.

In an embodiment, the pixel arrangement implements a dual-conversion-gain voltage-domain global-shutter pixel with low area.

The pixel arrangement is configured for imaging as an application.

In an embodiment, the image sensor is realized as complementary metal-oxide-semiconductor image sensor, abbreviated CMOS integrated sensor or CIS. The image sensor can be used in augmented reality (abbreviated AR), virtual reality (abbreviated VR), industrial and other image sensor applications.

In an embodiment, the transfer transistor, the coupling transistor, the reset transistor, the bias transistor, the first transistor, the second transistor and the select transistor are realized as metal-oxide-semiconductor field-effect transistors, abbreviated MOSFETs. For example, each of them is realized as n-channel MOSFET. Alternatively, each of them is realized as p-channel MOSFET.

Advantageously, the pixel arrangement improves low-light performance while maintaining standard dynamic range (abbreviated SDR) by utilizing a dual conversion gain (abbreviated DCG). The pixel arrangement uses two sample and hold capacitors implemented by the first and the second capacitor and furthermore the third capacitor, thus reducing an area of the pixel arrangement. The pixel arrangement performs a dual conversion. The pixel arrangement achieves a better low-light performance while maintaining a dynamic range on a reduced area.

BRIEF DESCRIPTION OF THE DRAWINGS

The following description of figures of examples or embodiments may further illustrate and explain aspects of the pixel arrangement, the image sensor and the method for operating a pixel arrangement. Arrangements, devices and circuit blocks with the same structure and the same effect, respectively, appear with equivalent reference symbols. In so far as arrangements, devices and circuit blocks correspond to one another in terms of their function in different figures, the description thereof is not repeated for each of the following figures.

FIGS. 1A to 1F show exemplary embodiments of a pixel arrangement;

DETAILED DESCRIPTION OF ILLUSTRATIVE EMBODIMENTS

Figures 1A, 1B:
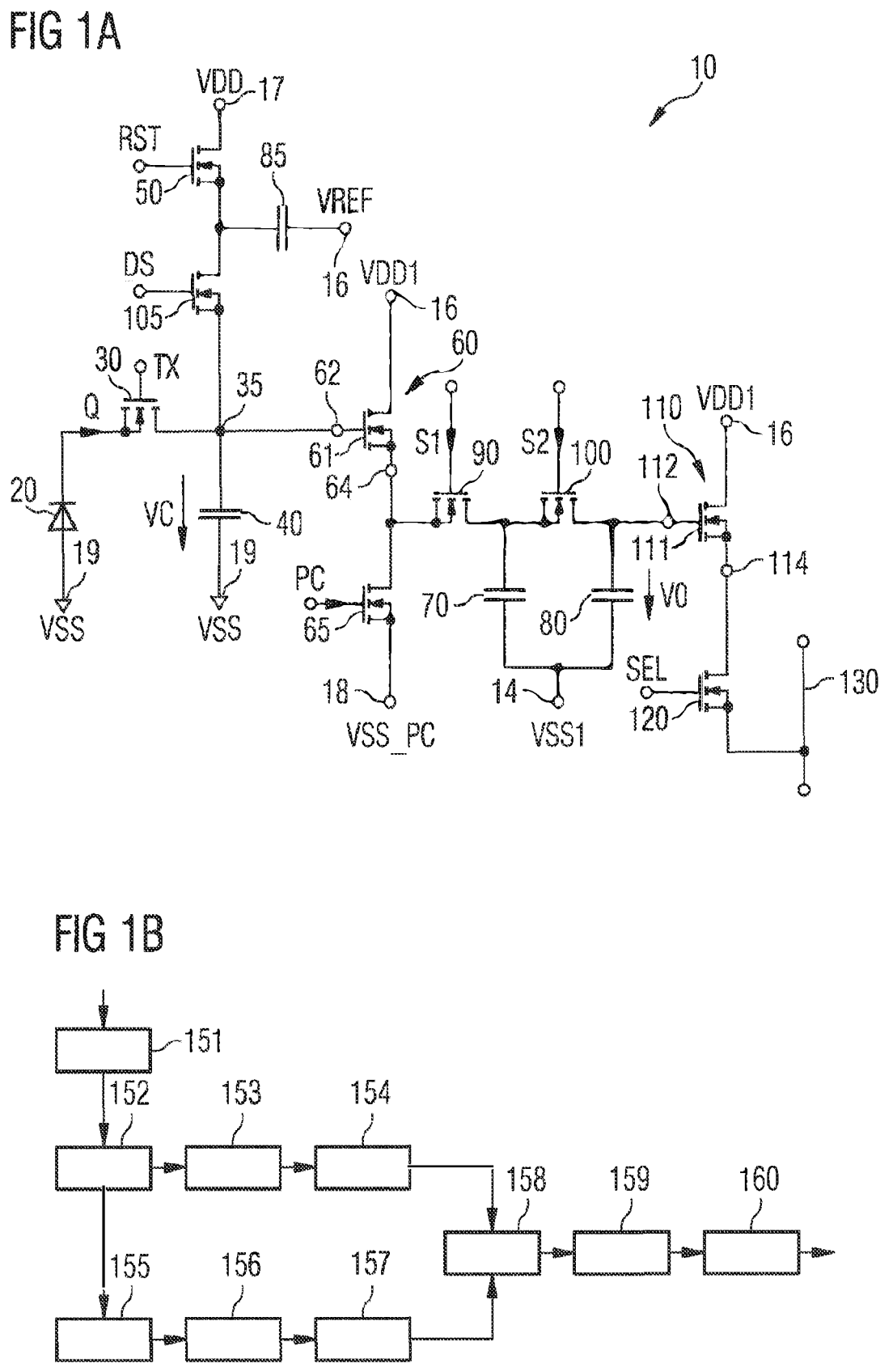
Figure 1C:
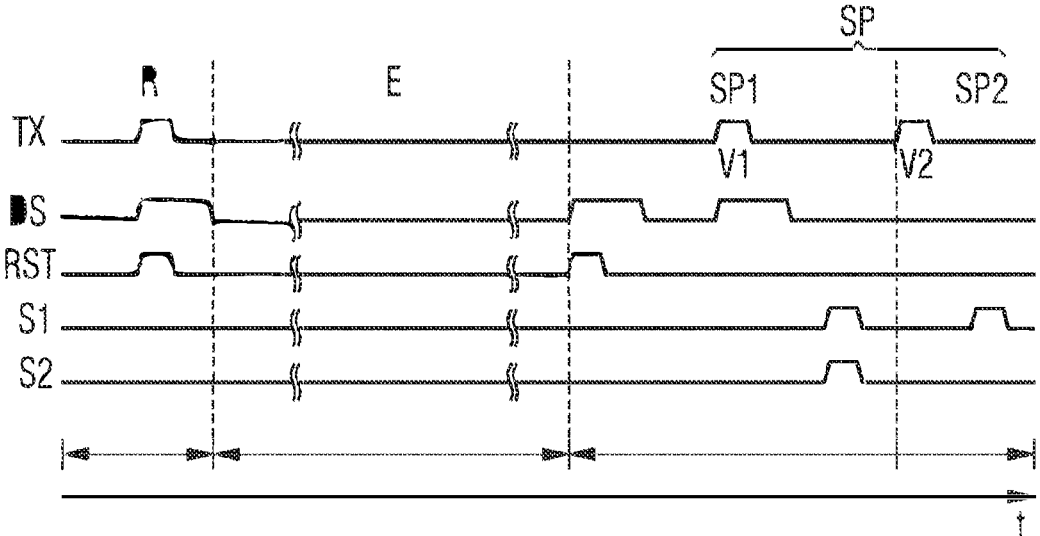

FIG. 1A shows an exemplary embodiment of a pixel arrangement 10. The pixel arrangement 10 comprises a photodiode 20, a circuit node 35 and a transfer transistor 30 coupled to the photodiode 20 and to the circuit node 35. A controlled path of the transfer transistor 30 connects a first terminal of the photodiode 20 to the circuit node 35. The transfer transistor 30 can also be named transfer gate. The pixel arrangement 10 includes an amplifier 60 with an input 62 coupled to the circuit node 35. The circuit node has a capacitance 40 which is e.g. a floating diffusion capacitance. The circuit node 35 is e.g. connected to or is equal with a first terminal of the capacitance 40.

The pixel arrangement 10 includes a first capacitor 70, a second capacitor 80, a first transistor 90 and a second transistor 100. The first and the second transistor 90, 100 can be named first and second switch. The first transistor 90 is coupled to an output 64 of the amplifier 60 and to the first capacitor 70. A controlled path of the first transistor 90 connects the output 64 of the amplifier 60 to a first electrode of the first capacitor 70. The second transistor 100 is coupled to the first transistor 90 and to the second capacitor 80. A controlled path of the second transistor 100 connects a terminal of the first transistor 90 to a first electrode of the second capacitor 80. Thus, the controlled path of the second transistor 100 connects the first electrode of the first capacitor 70 to the first electrode of the second capacitor 80.

Moreover, the pixel arrangement 10 comprises a coupling transistor 105, a reset transistor 50 and a supply terminal 17. The reset transistor 50 is coupled to the coupling transistor 105 and to the supply terminal 17. The coupling transistor 105 is coupled to the circuit node 35 and to the reset transistor 50. Thus, a first terminal of the coupling transistor 105 is connected to the circuit node 35. The first terminal of the coupling transistor 105 is connected to the input 62 of the amplifier 60. The first terminal of the coupling transistor 105 is connected to the transfer transistor 30. A second terminal of the coupling transistor 105 is connected to a first electrode of the third capacitor 85. The second terminal of the coupling transistor 105 is connected to a first terminal of the reset transistor 50. The first terminal of the reset transistor 50 is connected to the first electrode of the third capacitor 85. A second terminal of the reset transistor 50 is connected to the supply terminal 17. A second electrode of the third capacitor 85 is connected to a reference voltage terminal 16. The reference voltage terminal 16 is e.g. connected to the supply terminal 17, a further supply terminal 15 of the pixel arrangement 10, a reference potential terminal 18 of the pixel arrangement 10, a further reference potential terminal 14 of the pixel arrangement 10, a ground potential terminal 19 of the pixel arrangement 10 or an output of a voltage source (not shown).

The pixel arrangement 10 further includes a column line 130 and a further amplifier 110. The further amplifier 110 has an input 112 and an output 114. The input 112 of the further amplifier 110 is coupled to the second capacitor 80. Thus, the input 112 of the further amplifier 110 is connected to the first electrode of the second capacitor 80 and to the second terminal of the second transistor 100. The output 114 of the further amplifier 110 is coupled to the column line 130.

The pixel arrangement 10 comprises a select transistor 120 coupled to the column line 130 and to the output 114 of the further amplifier 110. The pixel arrangement 10 further comprises a bias transistor 65 coupled to the output 64 of the amplifier 60 and to the reference potential terminal 18 of the pixel arrangement 10.

The first electrode of the first capacitor 70 is coupled to a node between the first transistor 90 and the second transistor 100. A second electrode of the first capacitor 70 is coupled to the further reference potential terminal 14. The first electrode of the second capacitor 80 is coupled to a node between the second transistor 100 and the input 112 of the further amplifier 110. A second electrode of the second capacitor 80 is coupled to the further reference potential terminal 14. A second terminal of the capacitance 40 is connected to the ground terminal 19. The reference potential terminal 18 is connected to the ground terminal 19 or is not connected to the ground terminal 19. The further reference potential terminal 14 is connected to the ground terminal 19 or is not connected to the ground terminal 19. The further reference potential terminal 14 is connected to the reference potential terminal 18 or is not connected to the reference potential terminal 18.

The amplifier 60 includes an amplifier transistor 61 having a control terminal coupled to the input 62 of the amplifier 60. A first terminal of the amplifier transistor 61 is coupled to the further supply terminal 15 of the pixel arrangement 10. A second terminal of the amplifier transistor 61 is coupled to the output 64 of the amplifier 60. The amplifier 60 is implemented as a source follower.

The capacitance 40 of the circuit node 35 comprises e.g. a capacitance of the control terminal of the amplifier transistor 61, a capacitance of a pn junction of a terminal of the transfer transistor 30 and a capacitance of a pn junction of the first terminal of the coupling transistor 105. Thus, parasitic capacitances of the transistors connected to the circuit node 35 may result in the capacitance 40 of the circuit node 35. The value of the capacitance 40 of the circuit node 35 may be the sum of the values of the parasitic capacitances of the transistors connected to the circuit node 35. Optionally, the pixel arrangement 10 includes e.g. a capacitor connected to the circuit node 35; this capacitor may contribute to the capacitance 40.

For example, a capacitance of the first capacitor 70 and a capacitance of the second capacitor 80 are equal. The capacitance of the first capacitor 70 is e.g. higher than the value of the capacitance 40 of the circuit node 35. The capacitance of the second capacitor 80 is e.g. higher than the value of the capacitance 40 of the circuit node 35. A capacitance of the third capacitor 85 is e.g. higher than the value of the capacitance 40 of the circuit node 35. The first and the second capacitor 70, 80 is realized e.g. as metal-insulator-metal capacitor or as metal-insulator-semiconductor capacitor. The third capacitor 85 is realized e.g. as metal-insulator-metal capacitor or as metal-insulator-semiconductor capacitor.

The further amplifier 110 includes a further amplifier transistor 111 having a control terminal coupled to the input 112 of the further amplifier 110. A first terminal of the further amplifier transistor 111 is coupled to the further supply terminal 15. A second terminal of the further amplifier transistor 111 is coupled to the output 114 of the further amplifier 110. The further amplifier 110 is implemented as a source follower.

A supply voltage VDD is tapped at the supply terminal 17. A further supply voltage VDD1 is tapped at the further supply terminal 15. A reference potential VSS_PC is tapped at the reference potential terminal 18. A further reference potential VSS1 is tapped at the further reference potential terminal 14. The supply voltage VDD and the further supply voltage VDD1 are positive with respect to the reference potential VSS_PC. The supply voltage VDD and the further supply voltage VDD1 have different values. The reference potential VSS_PC and the further reference potential VSS1 have different values. A ground potential VSS is tapped at the ground terminal 19. The ground potential VSS is equal to or is different from the reference potential VSS_PC. The ground potential VSS is equal to or is different from the further reference potential VSS1. A reference voltage VREF is applied to the reference voltage terminal 16 and thus to the second electrode of the third capacitor 85.

A row driver (shown in FIG. 2) is coupled to the control terminal of the transfer transistor 30, the control terminal of the coupling transistor 105, the control terminal of the reset transistor 50, the control terminal of the bias transistor 65, the control terminal of the first transistor 90, the control terminal of the second transistor 100 and the control terminal of the select transistor 120. The row driver provides a transfer signal TX to the transfer transistor 30, a coupling signal DS to the coupling transistor 105, a reset signal RST to the reset transistor 50, a bias transistor signal PC to the bias transistor 65, a first control signal S1 to the first transistor 90, a second control signal S2 to the second transistor 100 and a select signal SEL to the select transistor 120. In case the reset signal RST sets the bias transistor 65 in a conducting state, the bias transistor 65 delivers a bias current for the amplifier 60.

The operation is explained using FIGS. 1B and 1C.

In an alternative embodiment, not shown, the supply terminal 17 is connected to the further supply terminal 15. The supply voltage VDD and the further supply voltage VDD1 are equal.

In an alternative embodiment, not shown, the reference potential terminal 18 is connected to the further reference potential terminal 14. The reference potential VSS_PC and the further reference potential VSS1 are equal.

FIG. 1B shows an exemplary operation performed by a pixel arrangement 10 which is shown e.g. in FIG. 1A. In FIG. 1B, the operation is shown in blocks. A method for operating the pixel arrangement 10 comprises e.g. the following blocks which can be named procedures or steps:

Block 151: Start of exposure: Electromagnetic radiation is converted into charge Q by the photodiode 20.

Optionally, the transfer barrier is modified based on a system input: The transfer signal TX that is provided to the transfer transistor 30 controls a barrier between the photodiode 20 and the circuit node 35. Typically, between two pulses of the transfer signal TX, a voltage value of the transfer signal TX is selected such that the barrier for a flow of charge between the photodiode 20 and the circuit node 35 is high.

Block 152: Transfer of a portion of the charge Q of the photodiode 20 to the capacitance 40 of the circuit node 35 and the third capacitor 85. A first pulse of the transfer signal TX is provided to the transfer transistor 30. A pulse of the coupling signal DS is applied to the coupling transistor 105. The first pulse of the transfer signal TX has a first voltage value V1. The charge Q is transferred from the photodiode 20 to the capacitance 40 of the circuit node 35 and the third capacitor 85 via the transfer transistor 30 and the coupling transistor 105.

Block 153: In a first storage phase EP1 of a storage phase EP, store charge on the first and the second capacitor 70, 80: The first and the second transistor 90, 100 are set in a conducting state for transferring charge to the second capacitor 80 from the capacitance 40 of the circuit node 35 and e.g. also from the photodiode 20. Charge can flow from the photodiode 20 as long as the charge Q of the photodiode 20 can overcome the barrier provided by transfer transistor 30. Thus, the charge Q generates a capacitance voltage VC at the input 62 of the amplifier 60. The amplified capacitance voltage is applied to the first and the second capacitor 90, 100. The second control signal S2 may have a short pulse for equalizing the voltages at the first and the second capacitor 70, 80.

Block 154: Readout of the second capacitor 80:

An output voltage VO tapped at the second capacitor 80 is amplified by the further amplifier 110. In case the select transistor 120 is set in a conducting state in a first readout phase RO1 of a readout phase RO, the amplified output voltage is provided to the column line 130 for digitization. A first digitized value is generated as a function of a first value of the output voltage VO, e.g. by an evaluation circuit (shown in FIG. 2).

Block 155: Transfer remaining charge Q to the capacitance 40 of the circuit node 35: A second pulse of the transfer signal TX is applied to the transfer transistor 30 for transferring further charge Q from the photodiode 20 to the capacitance 40 of the circuit node 35. The second pulse of the transfer signal TX has a second voltage value V2. The first voltage value V1 results in a higher barrier than the second voltage value V2. In an example, V1<V2. The coupling transistor 105 remains in a non-conducting state.

Block 156: In a second storage phase EP1 of the storage phase EP, store charge on the first capacitor 70: The capacitance voltage VC that is tapped at the capacitance 40 of the circuit node 35 is amplified by the amplifier 60. The amplified capacitance voltage is provided to the first capacitor 70 by providing a pulse of the first control signal Si to the first transistor 90.

Block 157: Readout of the first capacitor 70: After the output voltage VO at the second capacitor 80 has been readout in block 154 in the first readout phase RO1, the second transistor 100 is set in a conducting state. Thus, the voltages at the first capacitor 70 and at the second capacitor 80 equalize. Since the capacitance voltage VC is still amplified by the amplifier 60, the output voltage VO at the second capacitor 80 is equal to the amplified capacitance voltage. The output voltage VO is amplified by the further amplifier 110. When the select transistor 120 is set in a conducting state in a second readout phase RO2 of the readout phase RO, the amplified output voltage is provided to the column line 130 for digitization. A second digitized value is generated as a function of a second value of the output voltage VO by the evaluation circuit.

Typically, the steps of the blocks 152, 153, 155, 156 are performed in the storage phase EP. The steps of the blocks 154, 157 are performed in the readout phase RO.

Block 158: Subtract a voltage of the first capacitor 70 or a digitized value of the voltage of the first capacitor 70 from a voltage of the second capacitor 80 or a digitized value of the voltage of the second capacitor 80 (high conversion gain, abbreviated HCG): An output signal which represents an illumination IL of the photodiode 20 is a function of the first digitized value (resulting from block 153) and of the second digitized value (resulting from block 157). In an example, the first digitized value (resulting from block 153) is subtracted from the second digitized value (resulting from block 157) by the evaluation circuit.

Block 159: Gain up low conversion gain (abbreviated LCG).

Block 160: Linearization.

FIG. 1C shows an exemplary timing diagram performed by a pixel arrangement 10 which is shown e.g. in FIGS. 1A and 1B. The following signals are shown as a function of a time t: The transfer signal TX, the coupling signal DS, the reset signal RST, the first control signal S1 and the second control signal S2.

An example of the general operation is as follows:

The coupling signal DS goes high and the transfer signal TX is pulsed transferring a fraction of the charge Q of the photodiode 20 to the capacitance 40 of the circuit node 35 and to the third capacitor 85 (LCG Read).

The coupling signal DS goes low and the remaining charge Q of the photodiode 20 is transferred to the capacitance 40 of the circuit node 35 (HCG Read).

Thus, a low sensitivity signal is stored on the second capacitor 80 and a high sensitivity signal is stored on the first capacitor 70. This achieves a good low-light performance at a small size of the pixel arrangement 10 by utilizing dual conversion gain and only three capacitors.

The operation includes e.g. a reset phase R, an exposure phase E, the storage phase SP and the readout phase RO. The readout phase RO follows the storage phase SP. The storage phase SP follows the exposure phase E. The exposure phase E follows the reset phase R.

The storage phase SP includes the first and the second storage phase SP1, SP2. The second storage phase SP2 follows the first storage phase SP1. The readout phase RO includes the first and the second readout phase RO1, RO2. The second readout phase RO2 follows the first readout phase RO1.

The storage phase SP is a global storage phase and the readout phase RO is performed for each row separately. Therefore, there may be a time gap between the second storage phase EP2 and the first readout phase RO1.

During the exposure phase E, all charge is stored in the photodiode 20 with blooming path available through the transfer transistor 30, the coupling transistor 105 and the reset transistor 50.

Storage phase SP: The pixel operation after the exposure phase E includes:

Reset the third capacitor 85 and the capacitance 40 of the circuit node 35.

Partial transfer of the charge Q of the photodiode 20 to the third capacitor 85 and the capacitance 40 of the circuit node 35 using a first pulse of the transfer signal TX and a pulse of the coupling signal DS. The capacitance voltage VC depends on a duration between the end of the last reset of the photodiode 20 and the start of the first pulse of the transfer signal TX.

Store the signal at the capacitance 40 of the circuit node 35 (which is the capacitance voltage VC) after amplification by the amplifier 60 on the first and the second capacitor 70, 80 (LCG).

Transfer the remaining charge Q of the photodiode 20 to the capacitance 40 of the circuit node 35 using a second pulse of the transfer signal TX. The coupling transistor 105 remains in a non-conducting state. The capacitance voltage VC depends on a duration between the end of the first pulse and the start of the second pulse.

Store remaining signal of the capacitance 40 of the circuit node 35 (that is the capacitance voltage VC after amplification by the amplifier 60 on the first capacitor 70 (HCG).

High conversion gain (abbreviated HCG) is a correlated double sampling read (abbreviated CDS read), while low conversion gain (abbreviated LCG) is a differential double sampling read (abbreviated DDS read).

In an embodiment, the first pulse of the transfer signal TX in the first storage phase SP1 has a first voltage value V1 (named partial voltage level) and part of the charge Q of the photodiode 20 is transferred via the transfer transistor 30 to the capacitance 40 of the circuit node 35 and the third capacitor 85. The capacitance voltage VC depends on a duration between the end of the last reset of the photodiode 20 and the start of the first pulse and also on the first voltage value V1.

The second pulse of the transfer signal TX in the second storage phase SP2 has a second voltage value V2 and the remaining part of the charge Q of the photodiode 20 is transferred via the transfer transistor 30 to the capacitance 40 of the circuit node 35. The capacitance voltage VC depends on a duration between the end of the first pulse and the start of the second pulse and also on the second voltage value V2.

Figure 1D:
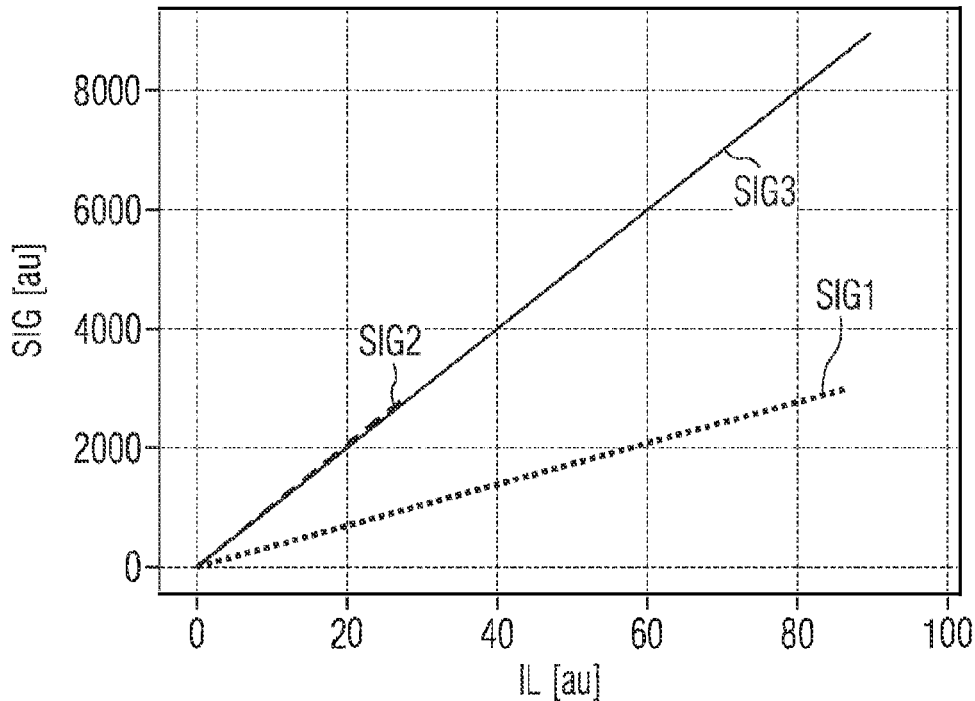

FIG. 1D shows an exemplary characteristic of a pixel arrangement 10 which is shown e.g. in FIGS. 1A to 1C. A response signal SIG in artificial units is shown as a function of an illumination IL in artificial units. A signal SIG1 (dotted line) is the signal achieved at low conversion gain. A signal SIG2 (dashed line) is the signal achieved at high conversion gain. An output signal SIG3 (solid line) is the signal achieved by a combination of the signals SIG1 and SIG2. The output signal SIG3 depends linearly on the illumination IL. Typically, the signal SIG1 achieved at low conversion gain has a less steep slope compared to the signal SIG2 achieved at high conversion gain. For example, the slope of the signal SIG1 achieved at low conversion gain is ½ or ⅓ or ¼ of the slope of the signal SIG2 achieved at high conversion gain. The slope depends e.g. on a value of the capacitance 40 of the circuit node 35 and on the capacitance value of the third capacitor 85. The slope difference depends on the gain ratio. The signals SIG1 and SIG2 are combined to the output signal SIG3. The output signal SIG3 is a function of the signal SIG1 achieved at low conversion gain, the signal SIG2 achieved at high conversion gain and a reset signal (not shown).

Figure 1E:
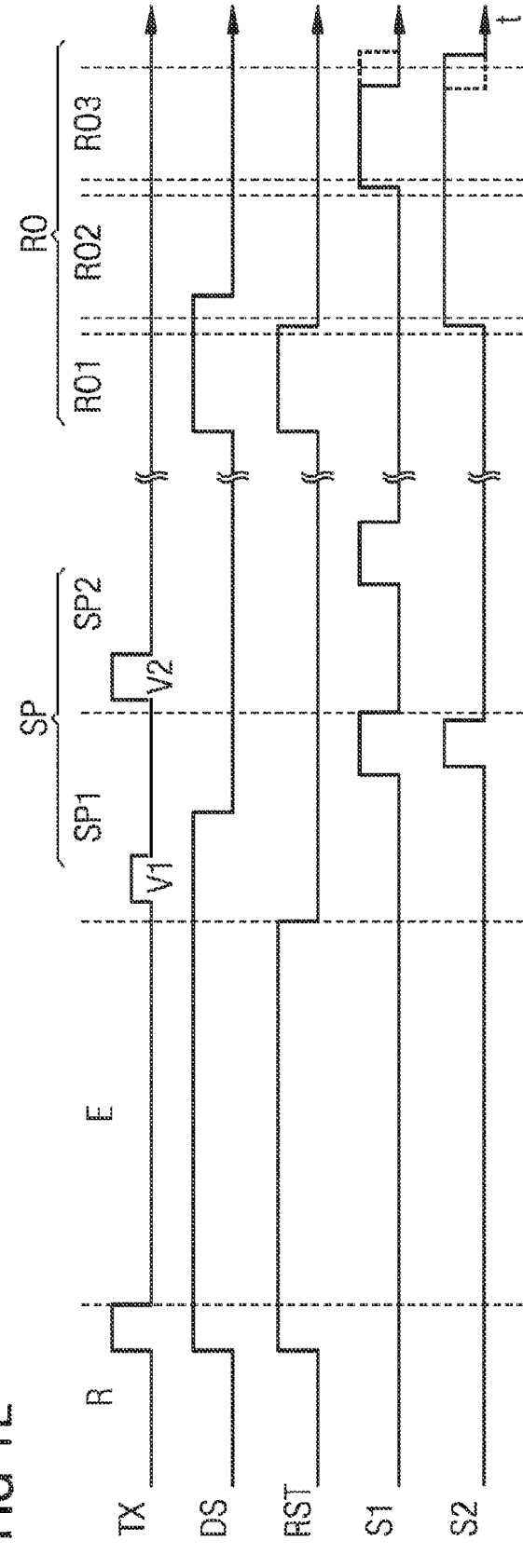

FIG. 1E shows an exemplary timing diagram performed by a pixel arrangement 10 which is shown e.g. in FIGS. 1A to 1D. In the reset phase R, a pulse of the reset signal RST is applied to the reset transistor 50, a pulse of the coupling signal DS is applied to the coupling transistor 105 and a pulse of the transfer signal TX is applied to the transfer transistor 30. Thus, the reset transistor 50, the coupling transistor 105 and the transfer transistor 30 are set in a conducting state and the supply voltage VDD is provided to the photodiode 20, the circuit node 35 and the third capacitor 85.

In the exposure phase E, the reset signal RST sets the reset transistor 50 in a non-conducting state. The pulse of the coupling signal DS which had started during the reset phase R is continuously applied to the coupling transistor 105. The pulse of the transfer signal TX which had started during the reset phase R is continuously applied to the transfer transistor 30. Thus, the supply voltage VDD is provided to the circuit node 35 and the third capacitor 85.

At a start of the first storage phase SP1, the first pulse of the transfer signal TX sets the transfer transistor 30 in a conducting state. The pulse of the coupling signal DS which had continuously been applied to the coupling transistor 105 in the exposure phase E is further applied to the coupling transistor 105. Thus, the coupling transistor 105 is in the conducting state. The charge of the photodiode 20 flows via the transfer transistor 30 to the capacitance 40 of the circuit node 35 and via the coupling transistor 105 to the third capacitor 85 at the start of the first storage phase SP1.

Before an end of the first storage phase SP1, a pulse of the first and the second control signal S1, S2 sets the first and the second transistor 90, 100 in a conducting state. The capacitance voltage VC tapped at the capacitance 40 of the circuit node 35 is amplified by the amplifier 60 and provided via the first and the second transistor 90, 100 to the first and the second capacitor. Thus, the method comprises providing a pulse of the first control signal Si to the first transistor 90 and a pulse of the second control signal S2 to the second transistor 100 before the end of the first storage phase SP1 for charging the first and the second capacitor 70, 80 as a function of the capacitance voltage VC.

At a start of the second storage phase SP2, the second pulse of the transfer signal TX sets the transfer transistor 30 in a conducting state. The coupling signal DS is in the non-conducting state. The charge of the photodiode 20 flows via the transfer transistor 30 to the capacitance 40 of the circuit node 35. There is no flow to the third capacitor 85 in the second storage phase SP2.

Before an end of the second storage phase SP2, a pulse of the first control signal S1 sets the first transistor 90 in a conducting state. The capacitance voltage VC tapped at the capacitance 40 of the circuit node 35 is amplified by the amplifier 60 and provided via the first transistor 90 to the first capacitor 70. Thus, the first capacitor 70 stores a voltage achieved with high conversion gain and the second capacitor 80 stores an output voltage VO achieved with low conversion gain. Thus, the method comprises providing a pulse of the first control signal Si to the first transistor 90 before the end of the second storage phase SP2 for charging the first capacitor 70 as a function of the capacitance voltage VC.

A readout phase RO follows the storage phase. A point of time of a start of the readout phase RO is flexible. The readout phase RO includes a first readout phase RO1 and a second readout phase RO2. The first readout phase RO1 follows the second storage phase SP2, e.g. with a time gap. In the first readout phase RO1, the second capacitor 80 is readout via the further amplifier 110 and the select transistor 110. Thus, the second transistor 100 is in a non-conducting state in the first readout phase RO1. The select transistor 129 is in a conducting state at least in a part of the first readout phase RO1. In the first readout phase RO1, the reset transistor 50 and the coupling transistor 105 are set in a conducting state. Thus, the supply voltage VDD is applied to the circuit node 35. Therefore, a reset of the capacitance 40 of the circuit node 35 is achieved. The capacitance voltage VC represents an absence of an illumination or dark level.

In the second readout phase RO2, the first capacitor 70 is readout via the second transistor 100, the further amplifier 110 and the select transistor 110. Thus, the second transistor 100 and the select transistor 129 are in a conducting state at least in a part of the second readout phase RO2. In the second readout phase RO2, the reset transistor 50 and the coupling transistor 105 are set in a non-conducting state.

The readout phase RO includes a third readout phase RO3. The third readout phase RO3 follows the second readout phase RO2. In the third readout phase RO3, the first and the second transistor 90, 100 are set in a conducting state. Thus, the capacitance voltage VC is amplified by the amplifier 60 and the amplified capacitance voltage is applied to the first and the second capacitor 70, 80 and to the input 112 of the further amplifier 110. The select transistor 129 is in a conducting state at least in a part of the first readout phase RO1 for providing a signal to the column line 130. The capacitance voltage VC is readout via the amplifier 60, the first and the second transistor 90, 100, the further amplifier 110 and the select transistor 110.

In the readout phase RO, the transfer signal TX is in a non-conducting state; the coupling signal DS and the reset signal RST may have other pulses as shown in FIG. 1E. FIG. 1E only shows an example of a possible timing of pulses; other timings can be realized also.

The timings in FIGS. 1D and 1E, showing the exposure phase E and the storage phase SP, are global timings, affecting all the pixel arrangements 10 of the array of the image sensor at the same time. In the global storage phase, the storage phase GS of each pixel arrangement 10 of the image sensor is performed in parallel. Then during the readout phase RO or readout operation, the pixel arrangements 10 are accessed sequentially row by row through the select signal SEL of each row. The readout of the reset level or reset value is done when the rows are sequentially accessed in the readout phase RO, e.g. in the third readout phase RO3 after the second readout phase RO2.

The pixel arrangement 10 implements a dual conversion gain mode where both gains are stored in the pixel arrangement 10 and are available for reconstruction at column level. Charge skimming is used for transferring high-light charges from the photodiode 20 to the third capacitor 85 prior to complete charge transfer. Barrier level choice depends on maximum floating diffusion swing allowed.

Figure 1F:
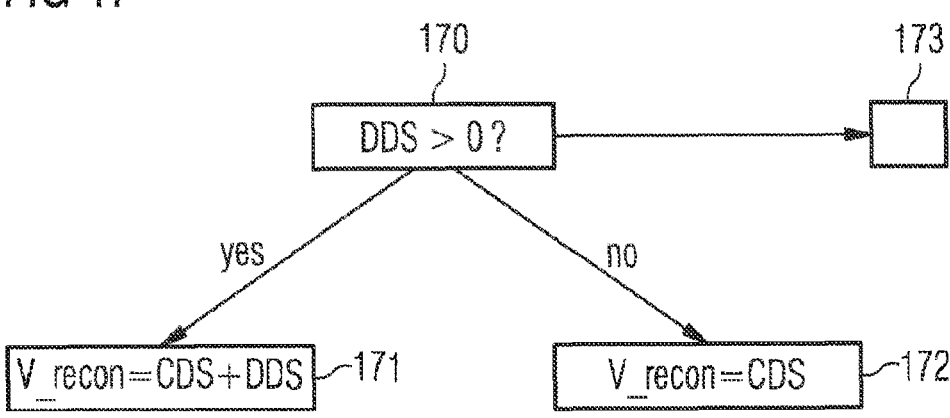

FIG. 1F shows an exemplary diagram of a pixel arrangement 10 which is shown e.g. in FIGS. 1A to 1E. The pixel arrangement 10 uses a standard dynamic range (abbreviated SDR) plus mode with a simplified reconstruction algorithm.

In block 170, the image sensor 200 checks whether the barrier affects the photodiode 20. In case, DDS>0 is true, block 171 is selected (DDS is the abbreviation of differential double sampling). In case, DDS>0 is false, block 172 is selected. The image sensor 200 determines whether the illumination is a low light or a high light illumination. In case of a high light illumination, block 171 is used. In case of a low light illumination, block 172 is used.

In block 171, the output signal V_recon of the pixel arrangement 10 is reconstructed using the result of CDS and DDS (CDS is the abbreviation of correlated double sampling). Block 171 shows a mid/high-light state. The value achieved with DDS is the reset level read during row readout-signal stored on the second capacitor 80: Column CG difference with CDS needs to be considered (DDS needs to be multiplied by 0.5*HCG/LCG). CDS is the signal stored on the second capacitor 80 minus the signal stored on the first capacitor 70. Block 171 performs CG coefficient adjustment. The output signal V_recon is a function of the signal SIG1 achieved at low conversion gain and the signal SIG2 achieved at high conversion gain.

In block 172, the output signal V_recon of the pixel arrangement 10 is reconstructed using the result of CDS. Block 172 shows a low-light state. The output signal V_recon is a function of the signal SIG2 achieved at high conversion gain and of the reset signal.

In an alternative block 173, the CDS is checked and a safe threshold level is set. If CDS is above threshold (e.g. above 2000 e-), the block 171 is selected.

Figure 2:
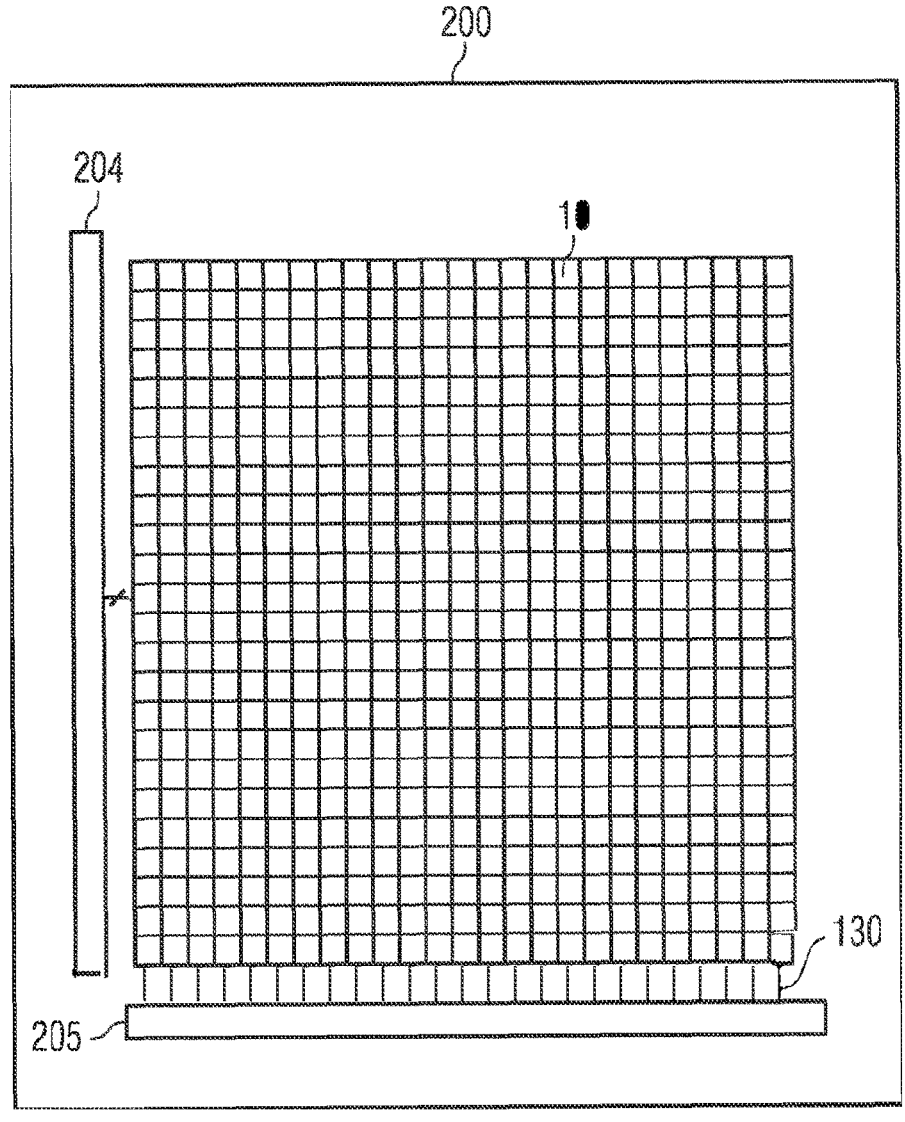
FIG. 2 shows an exemplary embodiment of an image sensor with a pixel arrangement.

FIG. 2 shows an exemplary embodiment of an image sensor 200 with a pixel arrangement 10 which is further development of the embodiments shown in FIGS. 1A to 1F. The image sensor 200 comprises an array of pixel arrangements 10. Moreover, the image sensor 200 further comprises a row driver 204 that provides the transfer signal TX, the coupling signal DS, the reset signal RST, the bias transistor signal PC, the first control signal S1, the second control signal S2 and the select signal SEL to the array of pixel arrangements 10. The row driver 204 provides these signals for each of the rows. The image sensor 200 includes an evaluation circuit 205 for digitizing the signals at the column lines 130.

Figure 3:
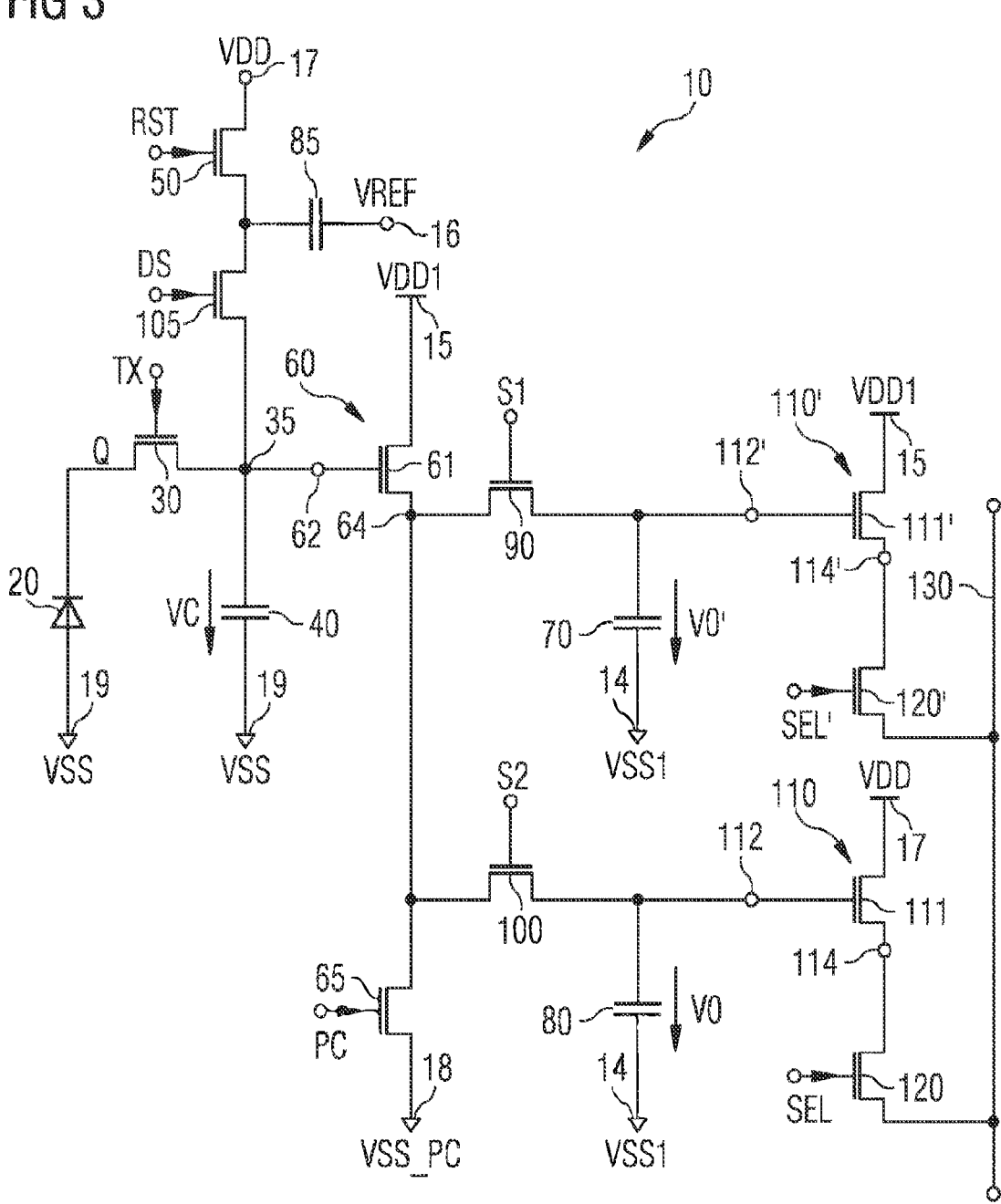
FIG. 3 shows a further exemplary embodiment of a pixel arrangement.

FIG. 3 shows an exemplary embodiment of a pixel arrangement 10 which is further development of the embodiments shown in FIGS. 1A to 1F and 2. The pixel arrangement 10 further comprises an additional amplifier 110' having an input 112' coupled to the first capacitor 70 and an output 114' coupled to the column line 130. The additional amplifier 110' comprises an additional amplifier transistor 111'. The pixel arrangement 10 further comprises an additional select transistor 120' that is coupled to the column line 130 and to the output 114' of the additional amplifier 110'. The second transistor 100 couples the output 64 of the amplifier 60 to the second capacitor 80.

The operation is similar to the operation shown in FIGS. 1C and 1E. A pulse of the first control signal Si is provided to the first transistor 90 before the end of the first storage phase SP1 for charging the first capacitor 70 as a function of the capacitance voltage VC at the capacitance 40 of the circuit node 35. When the additional select transistor 120' is set in a conducting state, the voltage stored on the first capacitor 70 is provided via the additional amplifier 110' and the additional select transistor 120' to the column line 130.

A pulse of the second control signal S2 is provided to the second transistor 100 before the end of the second storage phase SP2 for charging the second capacitor 80 as a function of the capacitance voltage VC at the capacitance 40 of the circuit node 35. Thus, the voltage with low gain is stored on the first capacitor 70 and the voltage with high gain is stored on the second capacitor 80. When the select transistor 120 is set in a conducting state, the voltage stored on the second capacitor 80 is provided via the amplifier 110 and the select transistor 120 to the column line 130.

The pixel arrangement 10 is used e.g. in a voltage domain global shutter pixel, abbreviated VGS pixel. The pixel arrangement 10 is implemented e.g. as a rolling shutter pixel. Two capacitors are utilized with dual conversion gain.

The invention is not limited to the description of the embodiments. Rather, the invention comprises each new feature as well as each combination of features, particularly each combination of features of the claims, even if the feature or the combination of features itself is not explicitly given in the claims or embodiments.

What is claimed is:

1. A pixel arrangement comprising:
a first photodiode;
a circuit node;
a first transfer transistor coupled to the first photodiode and to the circuit node;
a first amplifier with an input coupled to the circuit node;
a first capacitor and a second capacitor;
a first transistor coupled to an output of the first amplifier and to the first capacitor;
a second transistor coupled to the first transistor and to the second capacitor;
a supply terminal;
a reset transistor coupled to the supply terminal;
a coupling transistor coupled to the circuit node and to the reset transistor;
a third capacitor with a first electrode coupled to a node between the reset transistor and the coupling transistor;
a second amplifier having an input coupled to the second capacitor;
a column line;
a first select transistor coupled to the column line and to an output of the second amplifier
a third amplifier having an input coupled to the first capacitor; and
a second select transistor coupled to the column line and to an output of the third amplifier.

2. The pixel arrangement of claim 1,
wherein the first transfer transistor and the coupling transistor are set in a conducting state at a start of a first storage phase, and
wherein the first and second transistors or the first transistor are/is set in a conducting state before an end of the first storage phase.

3. The pixel arrangement of claim 2,
wherein the first transfer transistor is set in a conducting state at a start of a second storage phase, and
wherein the first transistor or the second transistor is set in a conducting state before an end of the second storage phase.

4. The pixel arrangement of claim 1, further comprising a first reference voltage terminal which is coupled to a second electrode of the third capacitor.

5. The pixel arrangement of claim 1, further comprising:
a first reference potential terminal; and
a bias transistor coupled to the output of the first amplifier and to the first reference potential terminal.

6. The pixel arrangement of claim 1,
wherein the first capacitor comprises:
a first electrode coupled to a node between the first transistor and the second transistor, and
a second electrode coupled to a second reference potential terminal, and
wherein the second capacitor comprises:
a first electrode coupled to the second transistor and a second electrode coupled to the second reference potential terminal.

7. The pixel arrangement of claim 1, further comprising:
a second photodiode; and

16 a second transfer transistor coupled to the second photodiode and to the circuit node.

8. An image sensor comprising:
an array of a pixel arrangement; and
a row driver,
wherein the pixel arrangement comprises:
a photodiode,
a circuit node,
a transfer transistor coupled to the photodiode and to the circuit node,
an amplifier with an input coupled to the circuit node,
a first capacitor and a second capacitor,
a first transistor coupled to an output of the amplifier and to the first capacitor,
a second transistor coupled to the first transistor and to the second capacitor,
a supply terminal,
a reset transistor coupled to the supply terminal,
a coupling transistor coupled to the circuit node and to the reset transistor, and
a third capacitor with a first electrode coupled to a node between the reset transistor
and the coupling transistor,
wherein the row driver is configured to:
provide a transfer signal to a control terminal of the transfer transistor,
provide a coupling signal to a control terminal of the coupling transistor,
provide a reset signal to a control terminal of the reset transistor,
provide a first control signal to a control terminal of the first transistor, and
provide a second control signal to a control terminal of the second transistor, and
wherein a first pulse of the transfer signal in a first storage phase has a first voltage value and a second pulse of the transfer signal in a second storage phase has a second voltage value, the first voltage value being different from the second voltage value.

9. The image sensor of claim 8, wherein the row driver is configured to:
set the transfer transistor in a conducting state by the transfer signal and to set the coupling transistor in a conducting state by the coupling signal at a start of a first storage phase, and
set the first transistor in the conducting state by the first control signal and to set the second transistor in the conducting state by the second control signal before an end of the first storage phase.

10. The image sensor of claim 9, wherein the row driver is configured to:
set the transfer transistor in a conducting state by the transfer signal at the start of a second storage phase, and
set the first transistor in the conducting state by the first control signal before the end of the second storage phase.

11. A method for operating a pixel arrangement, the method comprising:
converting electromagnetic radiation into charge by a photodiode;
providing a first pulse of a transfer signal to a transfer transistor and a pulse of a coupling signal to a coupling transistor for transferring the charge from the photodiode to a capacitance of a circuit node and to a third capacitor at a start of a first storage phase;

providing a pulse of a first control signal to a first transistor and a pulse of a second control signal to a second transistor before an end of the first storage phase for charging a first and a second capacitor as a function of a capacitance voltage at the capacitance of the circuit node or providing the pulse of the first control signal to the first transistor before the end of the first storage phase for charging the first capacitor as the function of the capacitance voltage at the capacitance of the circuit node;

providing a second pulse of the transfer signal to the transfer transistor for transferring further charge from the photodiode to the capacitance of the circuit node at a start of a second storage phase; and providing a pulse of the first control signal to the first transistor before the end of the second storage phase for charging the first capacitor as a function of the capacitance voltage at the capacitance of the circuit node or providing a pulse of the second control signal to the second transistor before the end of the second storage phase for charging the second capacitor as a function of the capacitance voltage at the capacitance of the circuit node.

12. The method of claim 11, wherein the first pulse of the transfer signal has a first voltage value, the second pulse of the transfer signal has a second voltage value, and the first voltage value is different from the second voltage value.

13. The method of claim 11, wherein, in a first readout phase, the second capacitor is readout via a column line and, in a second readout phase, the first capacitor is readout via the column line.

14. The method of claim 13, wherein, in a third readout phase, the capacitance of the circuit node is reset and a reset level is read out via the column line.

15. The method of claim 11, further comprising, in a reset phase, providing a pulse of a reset signal to a reset transistor, a pulse of the coupling signal to the coupling transistor and a pulse of the transfer signal to the transfer transistor for providing a supply voltage to the photodiode, the circuit node and the third capacitor.

* * * * *